United States Patent Office 3,127,416
Patented Mar. 31, 1964

3,127,416
NEW CHLORINATED DICARBOXYLIC ACID DICHLORIDE AND PROCESS FOR ITS MANUFACTURE
Peter Liechti, Binningen, Adolf Emil Siegrist, Basel, and Erwin Maeder, Munchenstein, Switzerland, assignors to Ciba Limited, Basel, Switzerland, a company of Switzerland
No Drawing. Filed Sept. 25, 1961, Ser. No. 140,235
Claims priority, application Switzerland Sept. 26, 1960
6 Claims. (Cl. 260—332.2)

The present invention provides a process for the manufacture of a dichloro-tetrahydrothiophene-2:5-dicarboxylic acid dichloride of the formula (1) 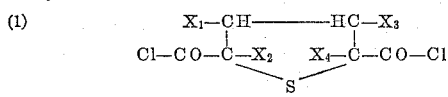

where $X_1$ and $X_3$ each represents a hydrogen atom and $X_2$ and $X_4$ each a chlorine atom, or $X_1$ and $X_3$ each represents a chlorine atom and $X_2$ and $X_4$ each a hydrogen atom, wherein tetrahydrothiophene-2:5-dicarboxylic acid is treated with a chlorinating agent. If desired, the dichloro-tetrahydrothiophene-2:5-dicarboxylic acid dichloride so formed is hydrolysed in an acid medium to thiophene-2:5-dicarboxylic acid or is reacted in an acid medium with an aminobenzene of the formula (2) 

where A represents an unsubstituted or substituted phenylene residue and Y an oxygen atom or the group

(where R represents a hydrogen atom or an organic substituent) to form a bisazole compound of the formula (3) 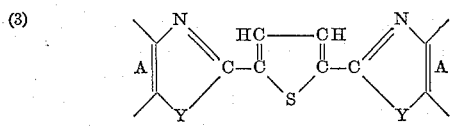

where A and Y have the above meanings—or is converted into a thiophene-2:5-dicarboxylic acid amide by reaction with ammonia or with a primary or secondary amine, or into a thiophene-2:5-dicarboxylic acid ester by reaction with an organic hydroxyl compound.

As chlorinating agent there may be used in the present process, for example, phosphorus pentachloride and sulfuryl chloride, also mixtures of phosphorus oxychloride and chlorine, phosphorus trichloride and chlorine, or thionyl chloride and chlorine. A particularly advantageous chlorinating agent is, for example, a mixture of phosphorus oxychloride, phosphorus trichloride and chlorine.

The treatment of tetrahydrothiophene-2:5-dicarboxylic acid with the aforementioned chlorinating agent is preferably performed at a temperature ranging from about 20 to 100° C. and in an anhydrous medium. If desired, inert organic solvents, for example aliphatic or aromatic chlorinated hydrocarbons, may be used concomitantly. By such a treatment of tetrahydrothiophene-2:5-dicarboxylic acid its two carboxyl groups are converted into carboxylic acid chloride groups and at the same time two hydrogen atoms are replaced by a chlorine atom each, that is to say that a dichloro-tetrahydrothiophene-2:5-dicarboxylic acid dichloride is formed.

The procedure adopted may consist, for example, in suspending tetrahydrothiophene-2:5-dicarboxylic acid in a mixture of phosphorus oxychloride and phosphorus trichloride, treating the whole with chlorine at about 20 to 95° C., then freeing the reaction mixture from excess chlorine by injecting a current of dry air, and finally evaporating the phosphorus oxychloride under vacuum at an elevated temperature. In this manner the carboxylic acid groups are converted into carboxylic acid chloride groups and at the same time two hydrogen atoms are replaced by chlorine atoms. Alternatively, these two reaction stages may be performed consecutively, for example the carboxylic acid groups are converted with thionyl chloride into carboxylic acid chloride groups, whereupon chlorine is caused to react upon the tetrahydrothiophene-2:5-dicarboxylic acid dichloride. If desired, the dichloro-tetrahydrothiophene-2:5-dicarboxylic acid dichloride so formed can be hydrolysed to the thiophene-2:5-dicarboxylic acid of the formula (4) 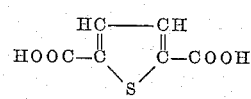

This hydrolysis is carried out in an acid medium, preferably by heating the dichloro-tetrahydrothiophene-2:5-dicarboxylic acid dichloride in an aqueous mineral acid, more especially in aqueous hydrochloric acid, at an elevated temperature, for example at a temperature ranging from about 70 to 90° C. In this manner the two acid chloride groups of dichloro-tetrahydrothiophene-2:5-dicarboxylic acid dichloride are hydrolysed to carboxyl groups and at the same time two molecules of hydrogen chloride are eliminated.

If desired, the resulting dichloro-tetrahydrothiophene-2:5-dicarboxylic acid dichloride can be reacted in an acid medium with an aminobenzene of the formula (2) 

where A represents an unsubstituted or substituted phenylene residue and Y an oxygen atom or the group

(where R represents a hydrogen atom or an organic substituent) to form a bisazole compound of the formula (3) 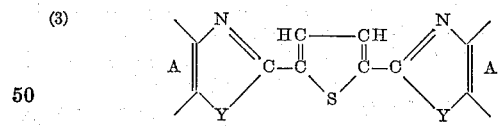

where A and Y have the above meanings.

The two phenylene residues A in the above Formula 3 may contain as substituents, for example, a chlorine atom, or a lower alkyl or alkoxy group with 1 to 4 carbon atoms, more especially a methyl or methoxy group, or a phenyl group. These substituents are preferably in position 5 or 6 of the benzoxazole residue.

In the case of the imidazole derivatives corresponding to the general Formula 3, where Y represents the group

R represents a hydrogen atom or an acyl radical; more especially, it is an aliphatic or araliphatic residue and preferably a lower alkyl, alkenyl or hydroxyalkyl radical such, for example, as a methyl, ethyl, isopropyl, allyl or hydroxyethyl radical.

Suitable aminobenzenes corresponding to the above Formula 2 are for example: 1:2-diaminobenzene, 1-amino-2-monomethylaminobenzene, 1-methyl-3:4 - diaminobenzene, 1-methoxy-3:4-diaminobenzene, isopropyl-orthophenylenediamine, 1-chloro-3:4-diaminobenzene; furthermore 1-hydroxy-2-aminobenzene and 1-hydroxy-2-aminomethylbenzenes such as 1-hydroxy-2-amino-4- or -5-methylbenzene, 1-amino-2-hydroxy-5-methoxybenzene, 1-amino-2-hydroxy-5-tertiary butyl-benzene, and 1-amino-2-hydroxy-5-chlorobenzene.

It is of advantage to use of the two starting materials required for this reaction, namely the aminobenzene of the above Formula 2 and the dichloro-tetrahydrothiophene-2:5-dicarboxylic acid dichloride, at least approximately stoichiometric proportions, that is to say, for every molecular proportion of dichloro-tetrahydrothiophene-2:5-dicarboxylic acid dichloride 2 molecular proportions of an aminobenzene of the Formula 2 or only little less or more. The reaction between the two components is carried out by heating at an elevated temperature, for example at about 120 to 260° C., if desired in an inert gas, for example under nitrogen. The reaction is carried out in an acid medium, for example in the presence of boric acid or of a sulfonic acid of the benzene series such as para-toluenesulfonic acid, or more especially in polyphosphoric acid, including pyrophosphoric acid.

When the reaction is carried out in the presence of boric acid, it is of advantage to use of this acid an amount ranging from about 0.5 to 5% calculated on the weight of the reaction mixture as a whole. When boric acid or for example para-toluenesulfonic acid is used, it is of advantage to use an inert high-boiling solvent, for example a substitution product of benzene such as monochlorobenzene, ortho-dichlorobenzene, trichlorobenzene or a high-boiling hydrocarbon of the benzene series, such as toluene, a xylene or para cymene. It is of advantage to perform the reaction at a boiling temperature in one of the aforementioned solvents.

In the dissolved or finely dispersed state the bisazole compounds of the Formula 3 display a more or less pronounced fluorescence. They can be used for example for optically brightening organic materials, more especially fibre materials.

If desired, the new dichloro-tetrahydrothiophene-2:5-dicarboxylic acid dichloride may be converted by reaction with ammonia or a primary or secondary amine into a thiophene-2:5-dicarboxylic acid amide, or by reaction with an organic hydroxyl compound into a thiophene-2:5-dicarboxylic acid ester. In the course of these reactions—which are performed, for example, at an elevated temperature and in an anhydrous medium, if desired in the presence of an inert organic solvent—the conversion of the two carboxylic acid chloride groups into carboxylic acid ester groups or carboxylic acid amide groups respectively is accompanied by the elimination of two molecular proportions of hydrogen chloride from each molecular proportion of the dichloro-tetrahydrothiophene-2:5-dicarboxylic acid dichloride. Suitable primary and secondary amines and organic hydroxyl compounds respectively are, for example, ethylamine, diisobutylamine, octylamine, monoethanolamine, diethanolamine, cyclohexylamine, benzylamine, aniline, $\alpha$- and $\beta$-naphthylamine, piperidine, morpholine; methanol, ethanol, allyl alcohol, n-butanol, hexanol, cyclohexanol, benzyl alcohols, phenol, para-tertiary butyl phenol, $\alpha$-naphthol and $\beta$-naphthol.

The dichloro-tetrahydrothiophene-2:5-dicarboxylic acid dichloride obtained by the present process is a new, valuable compound; it can be used as intermediate, for example for the manufacture of textile assistants.

Parts and percentages in the following examples are by weight.

Example 1

17.6 parts of tetrahydrothiophene-2:5-dicarboxylic acid (melting at 116–122° C.) are suspended in a mixture of 6.7 parts of phosphorus oxychloride and 27.5 parts of phosphorus trichloride. While stirring the mixture 15 parts of chlorine are introduced into it within about 7 hours, while maintaining the temperature at 20° C. by external cooling. 0.006 part of iodine are then added and another 16 parts of chlorine are injected at 90 to 95° C., whereupon the reaction mixture is freed from excess chlorine by injecting a current of dry air and evaporating the phosphorus oxychloride under vacuum at 80 to 90° C. The residual brownish red, clear oil consists of dichloro-tetrahydrothiophene-2:5-dicarboxylic acid dichloride; in the course of one hour it is added dropwise at 85° C. to a stirred solution of 1 part of concentrated hydrochloric acid in 35 parts of water. The whole is stirred for one hour longer, cooled to room temperature, and the granular precipitate is suctioned off, washed with water until it reacts neutral to Congo red and dried in vacuum at 80° C. until its weight remains constant. Yield: about 12.5 parts of thiophene-2:5-dicarboxylic acid of the Formula 4 in the form of a grey-brownish powder which turns brown above 200° C. and melts at 318 to 324° C.

A specimen of this product, after having been reprecipitated from a mixture of sodium hydroxide solution and hydrochloric acid and then sublimed in a high vacuum, melts at 310 to 313° C. and reveals the following analytical data:

|  | C | H | S |
|---|---|---|---|
| $C_6H_4O_4S$: |  |  |  |
| Calculated, percent | 41.86 | 2.34 | 18.36 |
| Found, percent | 41.07 | 2.45 | 17.85 |

When crude dichloro-tetrahydrothiophene-2:5-dicarboxylic acid dichloride is subjected to distillation under reduced pressure, it yields a colourless oil which boils at 83 to 84° C. under a pressure of 0.06 mm. Hg and at 135 to 140° C. under a pressure of 14 mm. Hg.

A fraction boiling at 83.5° C. under 0.06 mm. Hg pressure reveals a refractive index of $n_D^{24}=1.5487$, a specific gravity of $D^{24}=1.570$ and the following analytical data:

|  | C | H | S | Cl |
|---|---|---|---|---|
| $C_6H_4O_2SCl_4$: |  |  |  |  |
| Calculated, percent | 25.56 | 1.43 | 11.37 | 50.30 |
| Found, percent | 26.01 | 1.43 | 11.34 | 49.82 |

The tetrahydrothiophene-2:5-dicarboxylic acid used as starting material can be prepared as follows:

107.5 parts of a mixture of the stereoisomers of $\alpha:\alpha'$-dichloroadipic acid (melting at 148 to 156° C.) are dissolved in a solution of 53 parts of sodium carbonate in 150 parts of water. This solution is stirred and treated with a hot solution of 73 parts of commercial sodium sulfide of 70% strength in 40 parts of water, whereby the reaction mixture is caused to boil without external heating. The whole is stirred on until the temperature has dropped to about 70° C. without external cooling, then cooled in an ice+sodium chloride bath and the mixture is treated with 80 parts by volume of concentrated sulfuric acid at a rate such that the temperature does not rise above 40° C. When the mixture is extracted with ethyl acetate and the extract is decolorised with active carbon, dried with anhydrous sodium sulfate and evaporated, there are obtained about 74 parts of a colourless, viscous oil which solidifies to form a hard, colourless crystallisate when left to itself. By recrystallisation from hot methylethyl ketone there is obtained the mixture of cis- and trans-tetrahydrothiophene-2:5-dicarboxylic acid in the form of colourless crystals melting at 116 to 122° C.

Example 2

5.6 parts of dichloro-tetrahydrothiophene-2:5-dicarboxylic acid dichloride (prepared as described in Example 1) are stirred in dropwise at 115 to 120° C. under nitrogen within about 15 minutes into a solution of 4.32 parts of 1:2-diaminobenzene in 30 parts of polyphosphoric acid (containing 83% of phosphorus pentoxide). When the mixture is stirred for 2 hours at 115 to 120°, the evolution of hydrogen chloride ceases. The mixture is then stirred for another 6 hours at 135 to 140° C., allowed to cool to 120° C., 40 parts of water are slowly added dropwise, and the whole is cooled to room temperature, suction-filtered and washed with water. The olive-coloured residue is dissolved in 100 parts by volume of 2 N-sodium hydroxide solution, the solution is treated with active carbon and the bright-yellow filtrate which displays a strong blue fluorescence is adjusted with acetic acid to a pH value of about 7. After suction-filtration, washing and drying the compound of the formula (5)
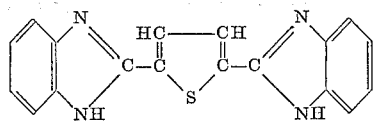

is obtained in the form of a brilliant bright-yellow powder which decomposes above 300° C. while undergoing partial sublimation.

*Example 3*

5.6 parts of dichloro-tetrahydrothiophene-2:5-dicarboxylic acid dichloride (prepared as described in Example 1) are stirred dropwise at 115 to 120° C. under nitrogen in the course of about 15 minutes into a solution of 4.36 parts of 1-hydroxy-2-aminobenzene in 60 parts of polyphosphoric acid (containing 83% of phosphorus pentoxide). The whole is stirred for 2 hours at 115 to 120° C., whereupon the evolution of hydrogen chloride ceases. The mixture is stirred on for hours at 155 to 160° C., cooled to 120° C., slowly treated with 35 parts of water and suction-filtered at room temperature. After having been washed and dried the residue forms a grey powder which on sublimation under vacuum furnishes yellow crystals melting at 212 to 215° C.; the resulting product corresponds to the formula (6)
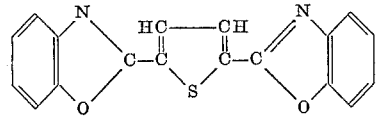

It can be used for optically brightening organic materials, more especially fibre materials.

*Example 4*

2.82 parts of dichloro-tetrahydrothiophene-2:5-dicarboxylic acid dichloride (prepared as described in Example 1) are stirred dropwise into a solution of 1.86 parts of aniline in 20 parts by volume of benzene. The benzene solution warms up slightly and a substantially colourless solution is formed accompanied by evolution of hydrogen chloride. The precipitate is suctioned off, washed successively with dilute hydrochloric acid, sodium carbonate solution and finally with water and then dried.

There are obtained about 1.65 parts of the anilide of the formula (7)
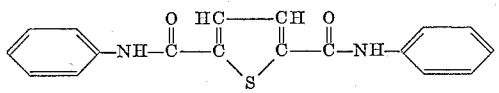

in the form of a yellowish powder melting at 281 to 290° C. On recrystallisation from dimethyl formamide the product forms colourless needles melting at 316.5 to 318° C. which display no depression of the melting point in admixture with a product prepared from thiophene-2:5-dicarboxylic acid dichloride and aniline.

*Example 5*

9.87 parts of dichloro-tetrahydrothiophene-2:5-dicarboxylic acid dichloride (prepared as described in Example 1) are added with vigorous agitation to 200 parts by volume of methanol. The methanol is then evaporated and the colourless crystalline residue is washed with a small amount of methanol to remove a small quantity of oily compounds and then dried. Yield: about 5.6 parts of thiophene-2:5-dicarboxylic acid dimethyl ester melting at 137 to 144° C. A recrystallised specimen melts at 149 to 150° C. and displays no depression of the melting point in admixture with a product prepared from thiophene-2:5-dicarboxylic acid and methanol.

*Example 6*

A mixture of 88 parts of tetrahydrothiophene-2:5-dicarboxylic acid and 200 parts by volume of thionyl chloride is refluxed; after about 90 minutes the evolution of hydrogen chloride and sulfur dioxide ceases. The excess thionyl chloride is distilled off under atmospheric pressure at a maximum bath temperature of 100° C.

The residue is subjected to fractional distillation in vacuum, to yield about 92.3 parts of tetrahydrothiophene-2:5-dicarboxylic acid dichloride as a colourless liquid boiling at 144 to 146° C. under 12 mm. Hg pressure.

66 parts of chlorine are introduced at 35 to 40° C. in the course of 60 minutes into 85.2 parts of tetrahydrothiophene-2:5-dicarboxylic acid dichloride. 7 parts of chlorine escape unconsumed. The reaction mixture is distiled in a high vacuum, to yield about 104 parts of the dichloro-tetrahydrothiophene-2:5-dicarboxylic acid dichloride described in Example 1 as a yellowish oil which boils at 90 to 94° C. under 0.25 mm. Hg pressure and is in every respect identical with the product described in Example 1.

What is claimed is:

1. Process for the manufacture of a chlorinated dicarboxylic acid dichloride selected from the group consisting of the compound of the formula

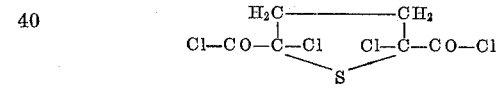

and the compound of the formula

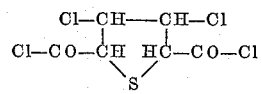

which process comprises treating tetrahydrothiophene-2:5-dicarboxylic acid in an anhydrous medium at a temperature ranging from 20 to 100° C. with a chlorinating agent comprising a mixture of phosphorus oxychloride, phosphorus trichloride and chlorine.

2. Process for the manufacture of dichloro-tetrahydrothiophene-2:5-dicarboxylic acid dichloride of the formula

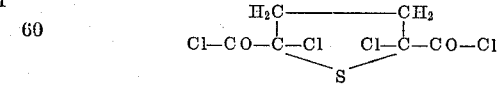

which comprises treating tetrahydrothiophene-2:5-dicarboxylic acid in an anhydrous medium and at an elevated temperature ranging from 20 to 100° C. with a chlorinating agent comprising a mixture of phosphorus oxychloride, phosphorus trichloride and chlorine.

3. Process for the manufacture of dichloro-tetrahydrothiophene-2:5-dicarboxylic acid dichloride of the formula

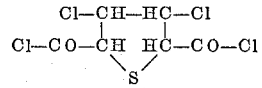

which comprises treating tetrahydrothiophene-2:5-dicarboxylic acid in an anhydrous medium and at an elevated temperature ranging from 20 to 100° C. with a chlorinating agent comprising a mixture of phosphorus oxychloride, phosphorus trichloride and chlorine.

4. A chlorinated dicarboxylic acid dichloride selected from the group consisting of the compound of the formula

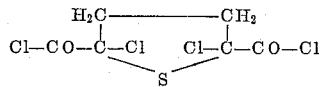

and the compound of the formula

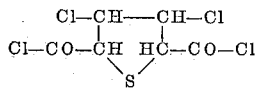

5. The compound of the formula

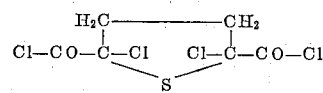

6. The compound of the formula

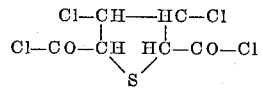

References Cited in the file of this patent

Runge et al.: Jour. Prakt. Chem. [4] 2, pp. 279–9? (1955).